United States Patent
Pasini et al.

(10) Patent No.: US 10,869,431 B2
(45) Date of Patent: Dec. 22, 2020

(54) GREENHOUSE LAMP

(71) Applicant: C-LED S.r.l., Imola (IT)

(72) Inventors: Alessandro Pasini, Imola (IT); Enzo Cuoghi, Imola (IT); Paolo Versari, Imola (IT); Mirco Berti, Imola (IT)

(*) Notice: Subject to any disclaimer, the term of this patent is extended or adjusted under 35 U.S.C. 154(b) by 0 days.

(21) Appl. No.: 16/608,161

(22) PCT Filed: May 2, 2018

(86) PCT No.: PCT/IB2018/053042
§ 371 (c)(1),
(2) Date: Oct. 24, 2019

(87) PCT Pub. No.: WO2018/203252
PCT Pub. Date: Nov. 8, 2018

(65) Prior Publication Data
US 2020/0196536 A1    Jun. 25, 2020

(30) Foreign Application Priority Data

May 5, 2017   (IT) .................. 102017000048561

(51) Int. Cl.

| A01G 9/24 | (2006.01) |
|---|---|
| A01G 7/04 | (2006.01) |
| F21S 8/06 | (2006.01) |
| F21V 3/02 | (2006.01) |
| F21V 17/16 | (2006.01) |
| F21V 21/005 | (2006.01) |
| F21V 23/00 | (2015.01) |
| F21V 23/06 | (2006.01) |
| F21Y 103/10 | (2016.01) |
| F21Y 115/10 | (2016.01) |

(52) U.S. Cl.
CPC ............. *A01G 9/249* (2019.05); *A01G 7/045* (2013.01); *F21S 8/061* (2013.01); *F21V 3/02* (2013.01); *F21V 17/164* (2013.01); *F21V 21/005* (2013.01); *F21V 23/001* (2013.01); *F21V 23/06* (2013.01); *F21Y 2103/10* (2016.08); *F21Y 2115/10* (2016.08)

(58) Field of Classification Search
CPC ..... A01G 9/249; F21V 17/164; F21V 21/005; F21V 23/06
See application file for complete search history.

(56) References Cited

U.S. PATENT DOCUMENTS

| 6,158,882 A | 12/2000 | Bischoff | |
|---|---|---|---|
| 7,513,640 B2* | 4/2009 | Hendrikus | ............. H01R 33/08 362/219 |
| 2005/0041418 A1 | 2/2005 | Fan | |
| 2016/0081145 A1 | 3/2016 | Peeters | |

* cited by examiner

*Primary Examiner* — Joseph L Williams
*Assistant Examiner* — Jacob R Stern
(74) *Attorney, Agent, or Firm* — Themis Law (57) ABSTRACT

A lamp for growing plants in a greenhouse, having an elongated shape with a longitudinal axis, includes one or more LEDs and connectors, configured to connect two adjacent lamps in series, wherein the longitudinal axis of the connector providing a connection between two adjacent lamps is oriented orthogonally with respect to the longitudinal axis of the lamp.

17 Claims, 6 Drawing Sheets

GREENHOUSE LAMP

The present invention relates to the technical field of lighting, in particular relates to lamps for growing plants in greenhouses, which lamps can be connected in series minimizing the area which cannot be lighted, thanks to the fact that lamp connectors are orthogonal with respect to the longitudinal axis of said lamp.

In the art, lamps employing LEDs with special wavelengths for the indoor growing of edible and ornamental plants are known.

In a greenhouse, which typically has transparent walls (made of glass or plastics), sunlight comes mainly from the top. This leads plants to orient their leaves so as to maximize the quantity of received light, a phenomenon known as phototropism. Generally plants tend to spontaneously orient their leaves at an angle of about 30-45° with respect to ground.

Typically, the lamps normally used in greenhouses tend to be placed at the top of greenhouses, i.e. above plants, and to irradiate their light perpendicularly with respect to ground. Nonetheless, this traditional disposition is not free from drawbacks, in that natural light cannot reach the lowest leaves of plants having vertical growth.

Moreover, installations of interlight lamps placed at 90° (i.e. placed between two adjacent plant rows) are gaining ground, wherein the disposition of leaves does not allow to exploit the vertical light beam: therefore, tilting the light beam is preferable in order to maximize the reception of the artificial light by leaves.

The paper Reducing the carbon footprint of greenhouse grown crops: re-designing LED-based production systems by Dieleman et al. (Acta Hortic. 1134. ISHS 2016. DOI 10.17660/ActaHortic.2016.1134.51) proposes to orient LEDs at 30° toward ground with the aim to improve the interception of light by plants.

Inside greenhouses, often plants are grown in long parallel rows: consequently, grow lamps must be placed in parallel rows allowing to directly illuminate plants. Nonetheless, in the state-of-the-art lamps, there is an alternation of light and shadow due to the end of a lamp (of a typical length of about 2-3 meters) and to the presence of a connector, which typically interrupts the lighted area up to the beginning of the successive lamp. In this way, the plants that are in the connector area receive less light with respect to the adjacent plants.

Typically, one of the reasons why plants are grown in a greenhouse is protecting them from cold. Greenhouses must be heated to bring the plants to a temperature allowing them to grow. This requires an ad hoc heating system, which represents an important portion of the expenditure required for working a greenhouse.

Finally, greenhouses must be cyclically cleaned; therefore, these lamps must be protected against the ingress of water.

Document US2005/0041418 discloses a Neon light using a rope light as a light source. The rope light comprising a row of LED connected to a common power signal feeding line. The LED light sources the components of the electric circuit for supplying the LED sources and the electric conductors connecting the LED sources and the electronic components are entirely covered towards the outside by a milky coloured gel body applied by injection moulding and providing the waterproof sealing of the rope light. Also the power cords at the two opposite ends of the rope light are injection over-moulded with the milky coloured gel body at least at the connection of the said power chords to the ends of the row of LED light sources. A case made of two shells is provided for the rope light. The case is formed by two shells. The case is closed by two terminal elements and the power chords at the ends of the rope light are passed outside the case through openings, which are provided at the lateral walls of the case. In the operating position, the base shell is positioned above the transparent shell and the passages for the power chords are in the vertical walls of the case. In case of damage of the light source, the entire rope light has to be substituted. The construction of the rope light itself requires to perform injection moulding and thus a relatively complex production process.

Aim of the present invention is providing a growing lamp for growing plants inside a greenhouse allowing to overcome the above-described drawbacks.

This object is achieved by an apparatus and a method having the features of the independent claims. Advantageous embodiment and refinements are specified in the claims dependent thereon.

The lamp according to the present invention has an oblong shape, having an elliptic transversal section or it has the form of a polygon, which is inscribable in an ellipsoid, the said elliptical or polygonal shape being oriented with its major axis perpendicular to the ground, wherein the connectors between two adjacent lamps are orthogonal with respect to the longitudinal axis of the lamp itself and with their axis oriented perpendicular to ground.

According to an embodiment of the present invention, at least one of the upper wall of the lamp or of the minor axis of the elliptical or polygonal shapes have a dimension in the direction transversal to the longitudinal axis of the lamp which are greater that the corresponding dimension of the lower wall and/or of the connector.

According to an alternative embodiment, the lamp is formed by two channel-like shells, one of which is an upper shell having an open side facing the lower shell and the other is a lower shell having an open side facing the upper shell, the upper shell having divergent lateral walls, the distance of the said lateral walls at the open side being larger than the distance of the lateral walls of the lower shell and the upper shell overlaps the lower shell for a length of the lateral walls of the lower shell in the direction transverse to the longitudinal axis of the said shells.

In a further embodiment, the upper and lower shells are provided respectively with an inner hook-like rim and with a groove, which is open towards the outside for engaging the hook-like rim, the said hook-like rim and the said groove having downward inclined surfaces oriented from the inside to the outside of the lamp and forming water discharging surfaces projecting outwards from the lateral walls of the lower shell.

In an embodiment, the lamp is provided with electrical connecting elements between a lamp and the following one in a series of lamps. Such embodiment provides electrical connection for each of the adjacent lamps, respectively, which couple through a reciprocal coupling according to a direction perpendicular to the longitudinal axis of lamps.

Typically, in a greenhouse the lamps are connected in series, so as to constitute a continuous lighting system, as long as the row of the plants to be cultivated.

In a preferred embodiment, said lamps are fed via feed-through wiring, so that the first lamp of a series only needs be connected to mains.

According to an embodiment, said feed-through wiring comprises at least a line of electrical conduction of a feeding signal, which extends from an end to the opposite end of a lamp in the direction of its longitudinal axis. At the first end there is provided a connector to a mains socket or to the preceding lamp in a row of lamps, and at the opposite end a connector to a connecting element in a following lamp in a row of lamps, respectively.

LEDs, which are the preferred light source of the lamp, emit light directed to the ground, with a tilting of the propagation axis of the light emitting aperture having an angle ranging 30-45° with respect to ground.

According to a further feature, the power supply is placed inside the lamp itself, with the result that the heat emitted by the lamp allows to heat the greenhouse.

It is worth noting that the temperature of the lighted lamp ranges between 40 and 55° C., which is an optimal temperature in that plants are typically placed very near to plants, and plants tend to suffer in presence of temperatures>55° C.

Typically, said lamp can be fed with 400 V or 220 V.

The method according to the present invention comprises the following steps:

Hanging at least two lamps, through a connection with the ceiling;

Connecting in series said at least two lamps, preferably via a feed-through connection from an end to the opposite end to the lamp, which ends are intended to be placed adjacent to the end of a preceding and following lamp in a row of lamps;

Placing the ends of the two lamps so that they are in contact, minimizing the non-lighted area below the connectors.

A first advantage of the present invention is the orthogonal orientation of the connectors with respect to the longitudinal axis of the lamp: this allows to minimize the distance between two consecutive lamps, reducing to a minimum the non-lighted area between two lamps.

A second advantage of the present invention lies in the elliptic transversal section of the lamp itself: the thin shape of the ellipse allows to minimize the shadow generated by the lamp on plants, and therefore to maximize the quantity of natural light that leaves can receive (assuming that in the greenhouse there is provided a mixed natural/artificial lighting).

A third advantage consists in mounting LEDs with a tilting ranging 30-45° with respect to the ground. Every plant has its preferred inclination of light: as described in the above-quoted paper, tomatoes grow better with LEDs oriented at 30°, but other plants of economic interest may have different requirements.

A fourth advantage is that the heat dissipated by power supply and lamp allows to heat said greenhouse, without the need of an ad hoc heating system.

Further advantages and properties of the present invention are disclosed in the following description, in which exemplary embodiments of the present invention are explained in detail based on the drawing.

Figure 1:
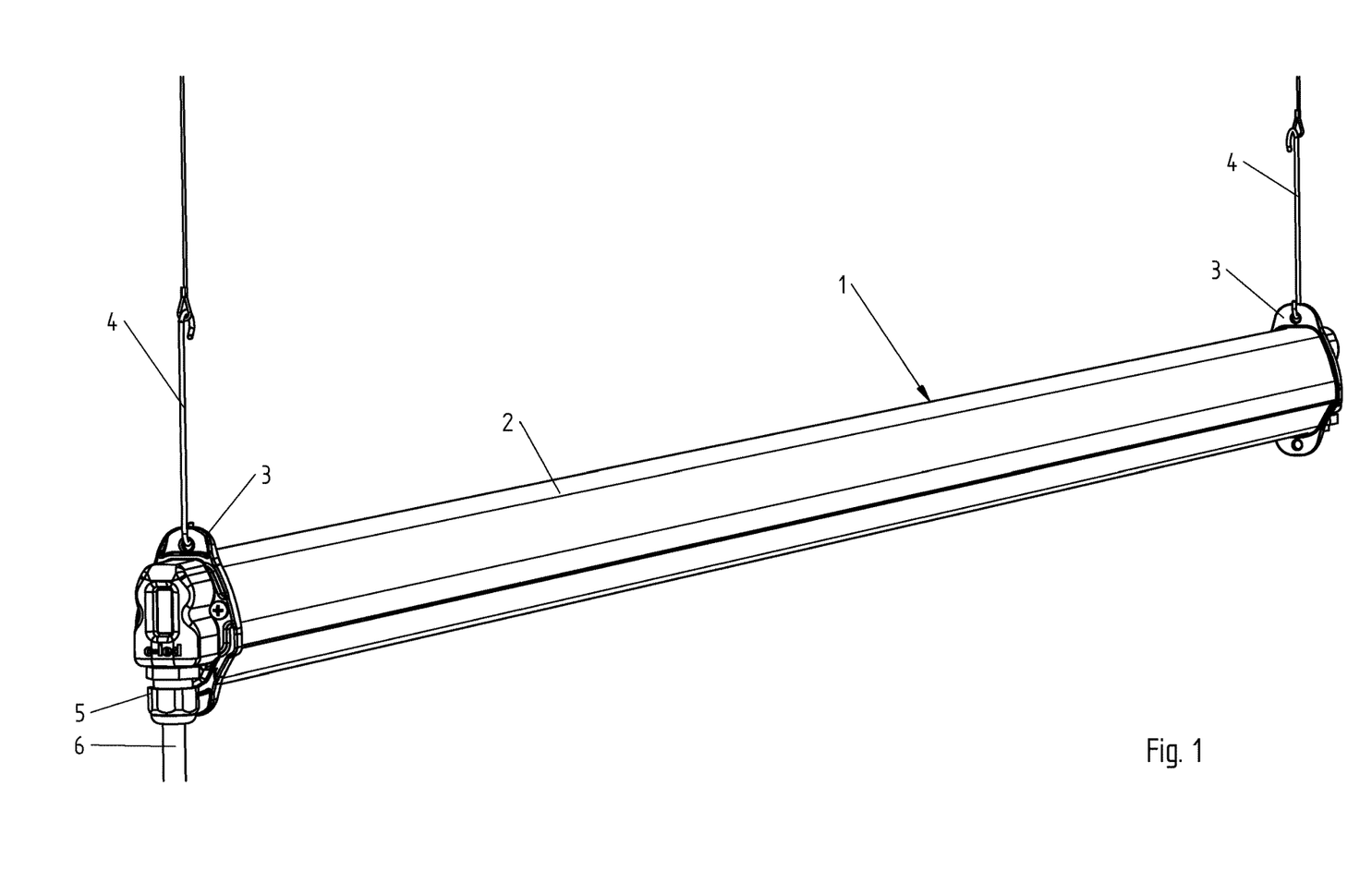
FIG. 1 Axonometric view of the lamp.

FIG. 1 shows an axonometric view of a lamp 1 according to the present invention. Lamp 1 has an elongated shape, with a substantially regular or irregular elliptic transversal section, having a body 2 and two ends 3. At ends 3, there are provided systems 4 for hanging said lamp to (not shown) greenhouse ceiling. In ends 3 there is provided a socket for a connector 5 allowing to connect in series any number of lamps 1 through a wiring 6.

Figure 2:
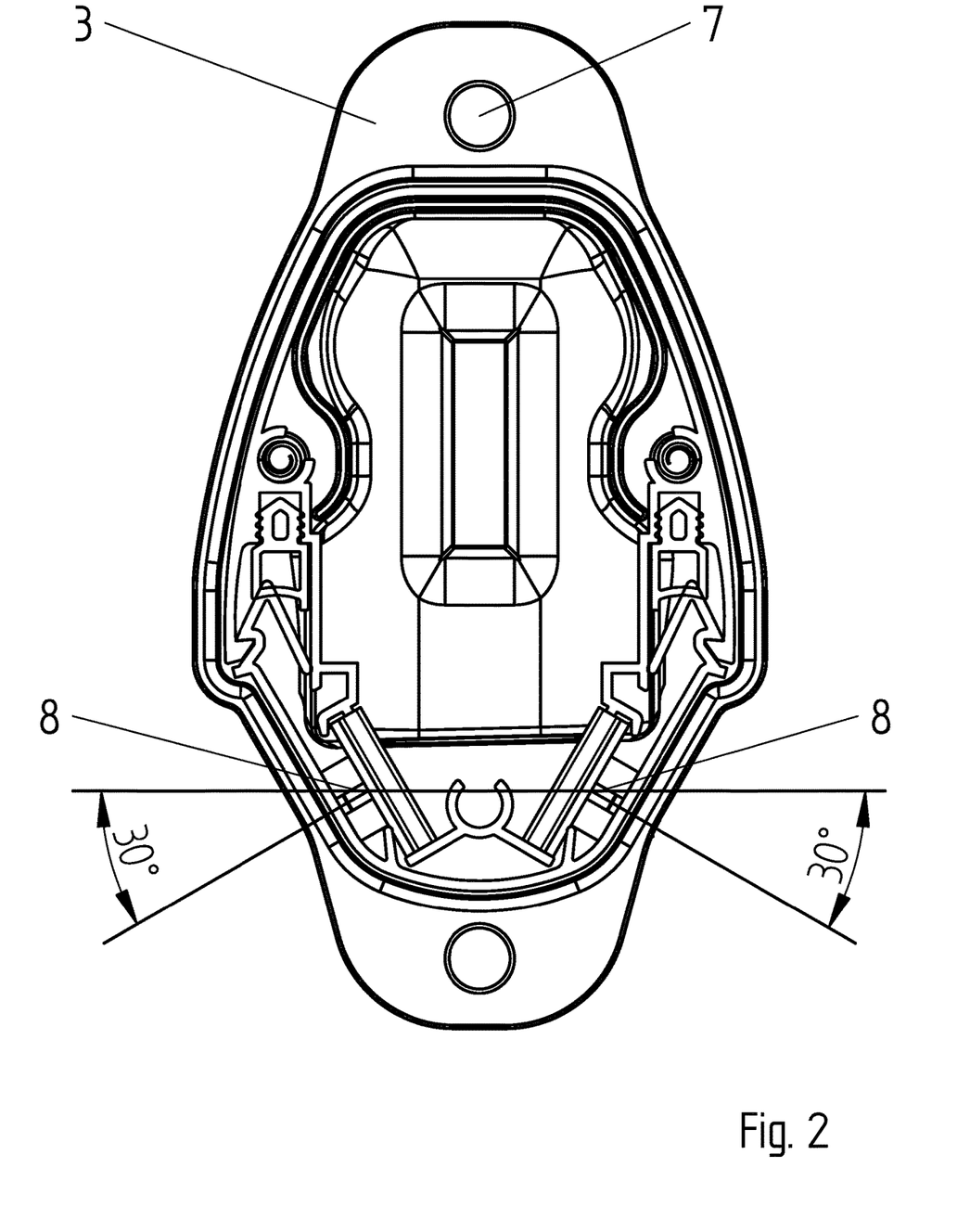
FIG. 2 Lateral view of the lamp, wherein a side cover was removed for better clarity.

FIG. 2 shows a lateral view of said lamp 1 according to the present invention. In particular, the Figure shows one of the two lateral ends 3 of lamp 1, wherein a side cover was removed for the sake of clarity. This view allows to observe the holes 7 through which the lamp hangs from the ceiling through the hanging system 4.

FIG. 2 shows a couple of LEDs 8 mounted, in a preferred embodiment, with a tilting of the propagation axis of the light radiation at 30° with respect to ground. It is apparent that this tilting can be modified as desired within the above-quoted range of 30-45°, as will be better described in the following.

Figure 3:
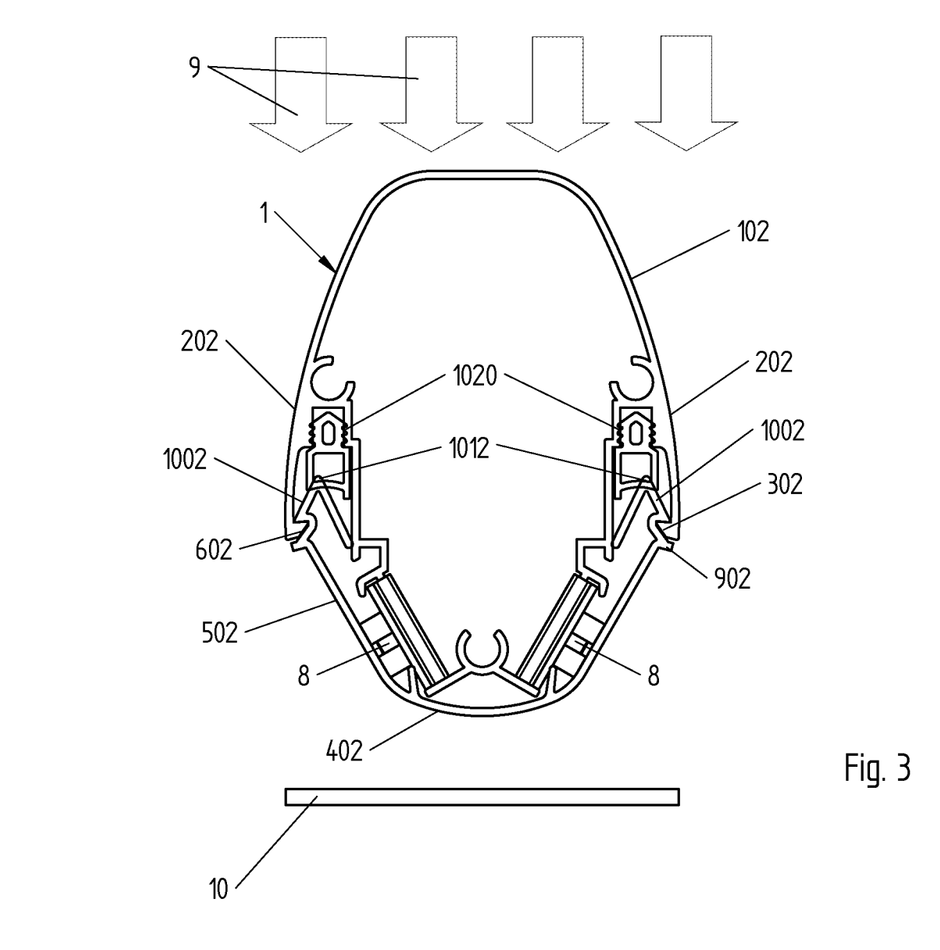
FIG. 3 Transversal section of the lamp showing the shadow projected by the lamp.

FIG. 3 shows a transversal section of the lamp, wherein arrows 9 represent the sunlight coming from the top, projecting the shadow 10 of lamp 1 towards the ground. In a preferred embodiment, indicatively the lamp is 2500 mm long, 70 mm high (major axis of the ellipse), becoming 100 mm if ends 3 with holes 7 are accounted for. The lamp is 56 mm wide (minor axis of the ellipse). The lamp elliptic shape and its small dimensions allow to project a small shadow on the ground, so as to interfere as little as possible with the process of reception of light by (non-shown) leaves.

Figure 4:
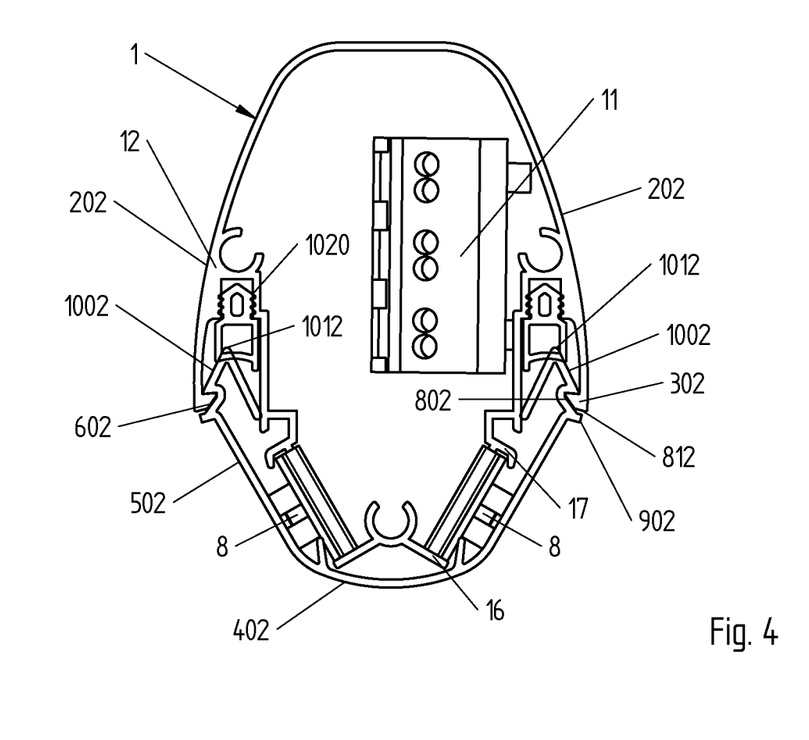
FIG. 4 Transversal section showing the position of the power supply.

FIG. 4 shows a transversal section of said lamp 1 realized in a different position with respect to that shown in FIG. 3, wherein a power supply 11 is visible. The position of the power supply 11 allows to diffuse the heat generated in the power supply along the whole metallic frame 12 of the lamp. In this way, lamps can be exploited as radiant elements to heat the greenhouse, with an important saving in the management costs of the greenhouse itself.

Figure 5:
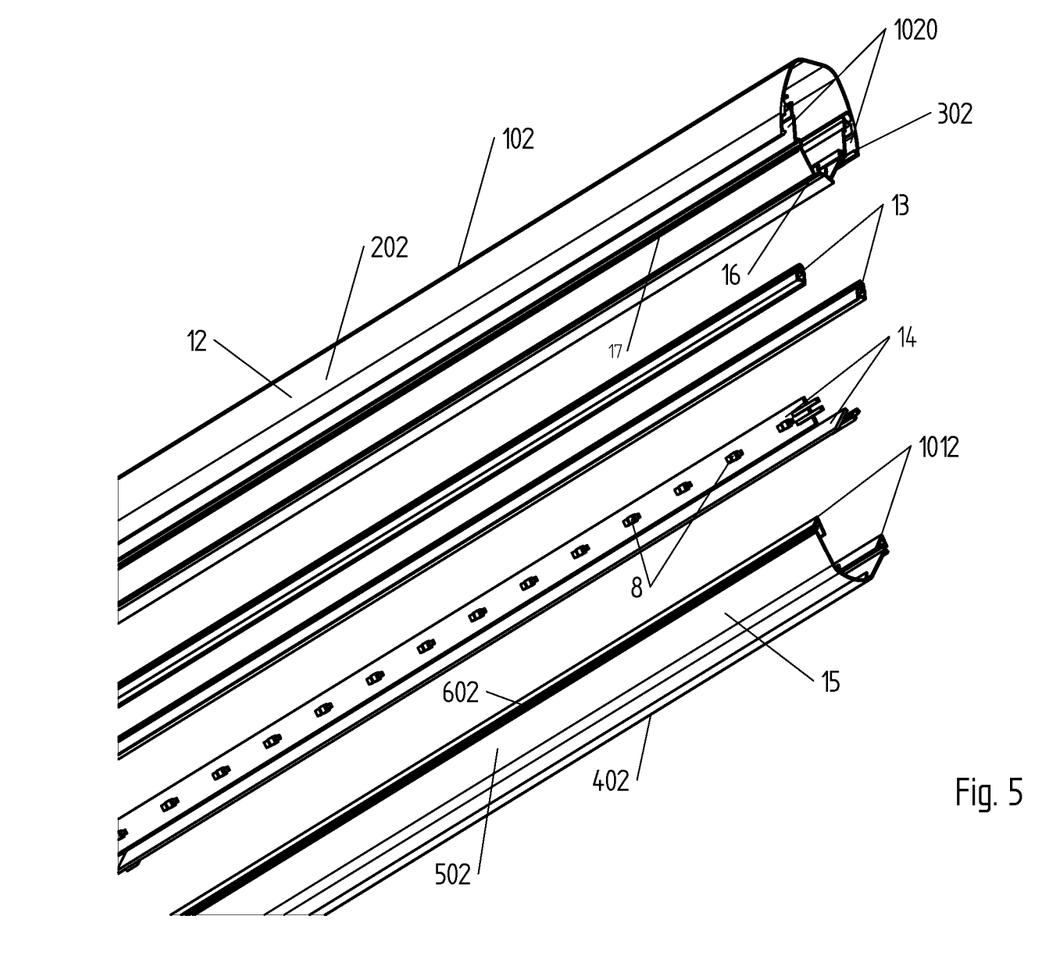
FIG. 5 Axonometric exploded view of the lamp body.

FIG. 5 shows an exploded view of a preferred embodiment of the lamp according to the present invention; the lamp 1 comprises:

A metallic frame 12, which in the preferred embodiment is made of aluminium;

A couple of gaskets 13;

A couple of PCBs (electronic boards) 14, on which a plurality of LEDs 8 are mounted at a regular distance;

A transparent cover, allowing to seal LEDs, and at the same time to irradiate light.

As can be better observed in FIG. 4, PCB 14 is kept in place by a couple of wings 16 and 17. Modifying the shape of said wings 16 and 17, the tilting of LEDs 8 can be varied, and therefore the orientation of the light cone emitted by them, which in the preferred embodiment shown here is 30° with respect to ground.

With orientation of the light cone emitted by the LEDs it is meant the orientation relatively to the horizontal plane of the axis of propagation of the light or in other words of the centre axis of the cone aperture, which is equivalent to the height of the said cone.

According to an embodiment, the aperture angle of the light cone emitted by each LED may be fixed. According to a variant embodiment, the said aperture angle of the cone may be varied by means of lenses, which can be overlaid to the light emitting window of the LED and which can be in the form of a continuous lense to be laid over the PCB 14 and the LED light sources provided on it, or in the form of singular elements each one mounted in front of the light emitting window of one of the LEDs.

Furthermore a variant embodiment provides of a cone beam aperture which is symmetrical relatively to the axis of propagation.

According to an alternative variant embodiment the said cone beam aperture may be non symmetrical with respect to the propagation direction, i.e. the height of the light cone emitted by the LEDS.

According to still a further variant embodiment, the inclination of the axis of propagation of the light cone and/or the light cone aperture angle and the symmetry or a-symmetry may be different for different groups of LEDs or for single LEDs on the same PCB 14.

According to still a further embodiment the inclination of the light sources can be varied such that the axis of propagation of the light beam i.e. the central axis of the light cone emitted by each LED has an inclination which can be set between 0° and 60° restively to the horizontal plane.

Each led emits a light cone having an aperture angle in the section plane perpendicular to the longitudinal axis of the lamp and which is directed along the central longitudinal axis of the said aperture cone.

Alternatively, instead of modifying the shape of the wings 16 and 17 a spacer or standoff element (not shown) may be provided for positioning the lower longitudinal end of the PCB 14 or the upper longitudinal end of the PCB 14 at a distance from the corresponding wing 16, 17 cooperating with it.

The said construction is advantageous when the light source is formed by a row of LED which are mounted one beside the other on a band like printed circuit board on which also the other electronic components needed to drive the LEDS are placed and electrically connected. In this case, the orientation of the light emission cone of the LEDS is determined by the inclination of the band-shaped PCB 14 and the wings 16, 17 engages the longitudinal edges of the said PCB 14 fixing it in position in a releasable way and also allowing to regulate the orientation of the light cone by means of the said spacers.

As it appears from the above the construction also allows to substitute the light source easily by simply substituting the PCB.

The couple of gaskets 13 is intended to ensure the impermeability of the lamp to the water used to irrigate the greenhouse, and even in the case of cyclical cleaning. In the embodiment here illustrated, gaskets ensure an IP66 or higher degree of protection (IP Code, International Protection Marking, IEC standard 60529). The first digit after IP indicates the level of protection that the enclosure provides against access to hazardous parts (e.g., electrical conductors, moving parts) and the ingress of solid foreign objects. The second digit after IP indicates the level of protection that the enclosure provides against harmful ingress of water. IP66 indicates that the lamp is dust tight (no ingress of dust; complete protection against contact), and that water projected in powerful jets against the enclosure from any direction shall have no harmful effects.

According to FIGS. 3 to 5, the present lamp shows a cross section having the shape of an ellipsoid or of a polygon, which is inscribed in an ellipsoid. The case of the lamp is formed by two channel-like shells, respectively an upper and a lower shell, the upper shell 102 has an open lower side and is closed laterally and at the upper side. The two lateral walls 202 diverge one from the other, preferably in a symmetric way with respect to a central vertical axis of the ellipsoid or of the polygon inscribed in the ellipsoid.

The two diverging lateral walls 202 ends with an internal hook-like rim 302. This rim has a wedge like cross section.

The lower shell 402 is oriented with an open upper side towards the open lower side of the upper shell 102 and is closed at the bottom and at the lateral walls. The two lateral walls 502 diverge one from the other starting from the bottom side at which the said two lateral walls have the shortest distance and diverging outwardly in the direction of the upper open side at which the two lateral walls 502 have the highest distance one relatively to the other. Along the longitudinal ends of the lateral walls 502, the said lateral walls are provided with a lateral groove 602 in which the hook-like rim 302 of the upper shell 102 engages.

According to an embodiment, as it appears from FIGS. 3 to 5 the distance of the ends of the two lateral walls 202 of the upper shell 102 are larger than the distance of the ends of the lateral walls 502 of the lower shell 402. The difference in the said distances is configured such that the ends of the lateral walls 202 of the upper shell 102 engage with their hook-like, internal rims the grooves 602 at the upper ends of the lateral walls 502 of the lower shell with a certain elastic force of the lateral walls of the upper shell 102 against the lateral walls 502 of the lower shell 402.

As it appears from the figures to obtain this the dimension relating the width of the open sides of the upper and of the lower shell 102, 402, i.e. the distance of the longitudinal ends of the lateral walls 202, 502 of the said two shells 102, 402 at the open side are different and the lateral walls 202 of the upper shell 102 overlaps for a certain length the longitudinal ends of the lateral walls 502 of the lower shell 402.

Furthermore, as it appears from FIGS. 3 to 5, the hook-like rims 302 having a wedge like cross section along the ends of the lateral walls 202 of the upper shell have on the side facing downwards, i.e. facing the lower shell 402, an inclined surface relatively to the vertical direction, the said inclined surface diverging towards the outside in a downward direction and forming a vertex with the outer surface of the corresponding lateral side 202 similarly to a half arrow.

This inclined surface cooperates with an essentially correspondingly inclined surface 702 of the groove 602 along the ends of the lateral walls 502 of the lower shell 402 so forming a downward inclined flowing surface for the water which could begin to penetrate between the groove and the hook-like rim.

According to still a further feature, the said inclined surface of the hook-like rims 302, may be formed having two different inclinations 802, 812 one part which is more internal and is steeper than the second part which is more external and connects to the outer surface of the lateral wall which is less steep than the previous part. Along this less inclined or less steep part of the inclined surface of the lateral walls 502 of the lower shell 402, the grow maintains its inclination so that the facing inclined surface of the hook-like rim diverges from the inclined surface of the groove and projects water droplets more efficiently to the outside.

In order to enhance this effect along each groove 602 each inclined surface 702 of the said groove 602 projects further towards the outside with a longitudinal wing 902. According to an embodiment, the longitudinal wing is at a distance from the inclined surface 812 of the hook-like rim 202 and has approximately the same inclination as the said less steep inclined surface 812 of the hook-like rim 202.

All the above features which may be provided in any combination and which are shown together in the embodiment of FIGS. 3 to 5 contribute in a very effective way to ensure that water cannot diffuse inside the lamp case as it could be happen due also to capillary effects.

Still according to a further feature, the longitudinal ends of the lateral walls 502 of the lower shell are provided in a longitudinal terminal wing 1002 which can be elastically bent towards the inside of the lower shell and which cooperates with the elasticity of the ends of the lateral walls 202 of the upper shell 102.

According to an embodiment, the said wing 1002 is obtained by a longitudinal terminal band of the lateral walls 502 which is bent towards the inside of the lower shell 402 along a longitudinal axis, forming a rib 1012 oriented towards the upper shell 102 and which cooperates with a longitudinal gasket 13 housed in longitudinal grooves 1020 provided in the upper shell along the internal face of each lateral side 202. According to the above features, at the same time as fixing by snap engagement of the two shells 102, 402 is carried out, the lower shell 402 fits inside the upper shell 102 both forming lateral outflow surfaces for the water droplets falling onto the lamp body and furthermore the wings 1002 are pressed with the rib 1012 against the gasket 13 thus providing a water proof sealing.

According to still a further embodiment which is illustrated in combination with the above embodiments but which can be provided also separately, the lateral walls 502 forms the windows through which the light emitted by the diodes is projected.

Figure 6:
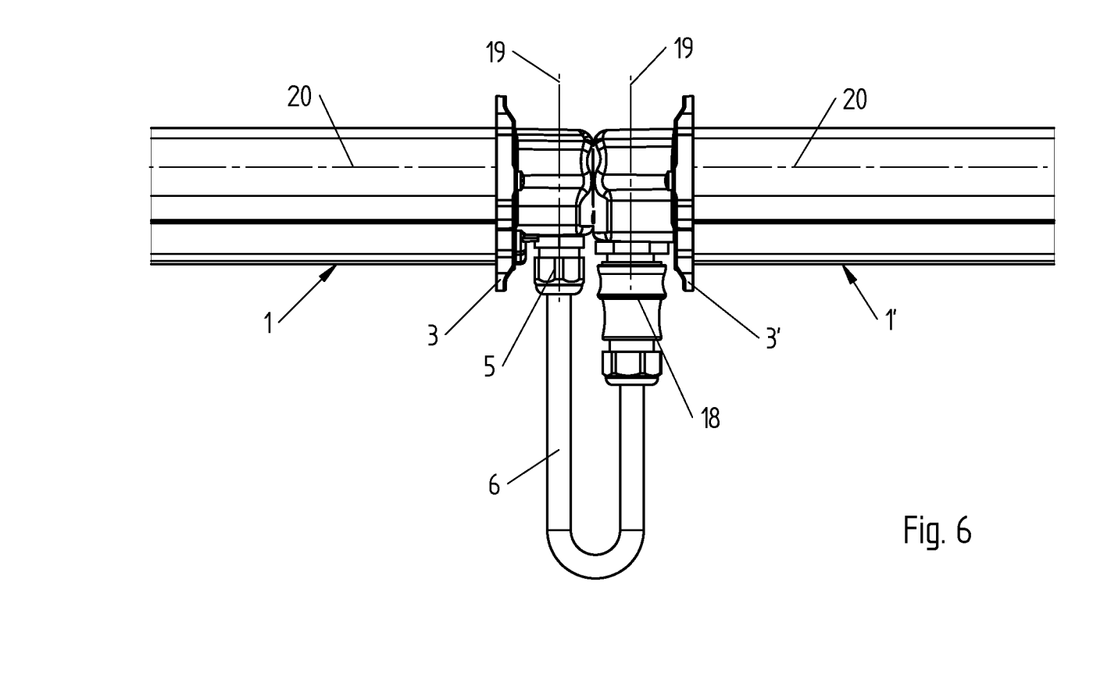
FIG. 6 Axonometric view of two consecutive lamps connected in series.

FIG. 6 shows two lamps 1, 1' connected in series. The two ends 3, 3' are in contact thanks to the fact that the (dotted) axis 19 of connectors 5 and 18 are placed perpendicularly with respect to the (dotted) longitudinal axis 20 of the two lamps 1, 1'.

The two connectors 5 and 18 are different. The connector 5 is a simple feedthrough connector, while the connector 18 is the assembly of a male connector and a female connector. Said male connector is integral with the feed wiring 6, while the female connector is integral with the end 3 of lamp 1'. The connector 18 can be assimilated to a socket-and-plug set.

As is apparent, both in the case of connector 5, i.e. the feedthrough connector, and in the case of connector 18 comprising a male and a female portion which can be connected and separated from each other, the axis of the feedthrough connector and therefore of the cable crossing the connector, and the coupling and uncoupling axis of the two parts of connector 18 are oriented perpendicularly to the longitudinal axis of the lamp. Therefore, the cable of the connecting element is oriented perpendicularly to the longitudinal axis of the lamps in correspondence of the end near feedthrough connector 5 and in the area of connector 18, easing the disposition of the connecting cable along a path that forms a U-shaped loop.

It is worth noting that each lamp can be provided with an input connector which forms the female portion cooperating with a male portion of a connector of the kind indicated with 18, while at the opposed end each lamp is provided with a length of the connecting cable which comes from its body with a feedthrough 5 and ends with a male portion intended to cooperate with a female portion of a connector of an adjacent lamp, the two part of connectors being suitable to form a connector of the kind indicated with 18. Obviously, the two male and female portions that together form a connector 18 can be reversed.

According to a further feature, the lamp is provided with two terminal elements at its opposed ends. Each of said element closes on the corresponding ends the tubular elongated body having a substantially ellipsoid section or a polygonal section inscribable in an ellipsoid.

According to a still further feature, each terminal element is provided with at least an aperture for a cable and/or an electrical connection. The axis of said aperture is oriented in a direction perpendicular to lamp longitudinal axis, and in parallel to the direction of coupling/uncoupling of the electrical connector to a corresponding element of a connector. In the aperture a feedthrough connector 5 can be fixed, whose axis is oriented in a direction parallel to that of said aperture.

Cable 6 can be as long as wished, but in the preferred embodiment shown here tends to be as short as possible. As shown in FIG. 6, the ends 3 and 3' cannot emit light, which is emitted by the lamp body 2 only. Nonetheless, their small shape (about 50 mm for each end 3, 3') allows to keep to a minimum the area which cannot be lighted.

The LEDs 8 which form the light source of the lamps according to the present invention typically emit a red radiation (630-670 nm, peak 660 nm), and preferably a blue radiation (400-500 nm, peak 450 nm). The LEDs 8 can be chosen according to different criteria, with the aim to use the radiation favouring germination, growing, blooming, or ripening of some fruits.

According to an embodiment the lamp body has a major and a minor axis, the major axis being oriented vertically and the minor axis being oriented horizontally during the use of the lamp. The lamp body or only the two terminal elements 3 at the ends of the lamp body 1, 1' having a lower side at which the said feedthrough 5 and the said connector 18 are provided the said feedthrough and the said connector 18 having dimensions along the longitudinal direction of the lamp body 1, 1' and of the direction transversal to the said longitudinal direction which are smaller than the minor axis of the lamp body 1, 1' or of the terminal elements 3.

According to a further feature, as it appears from the figures the lower side of the lamp body 1, 1' or at least of the terminal elements 3 is a horizontal wall having a length in the direction transversal to the longitudinal axis of the lamp and the said feedthrough 5 and/or the said connector 18 are positioned within the said length so that they are completely covered by the said terminal element in relation to a vertical direction.

According to a further feature, a continuous power feeding line comprising at least two conductors is provided running from the connector 18 to the cable 6 at the opposite end of the lamp 1, 1', the power signal to the power supply 11 of the LED sources associated to the said lamp being fed by branching out from the continuous power feeding line. Thus, the lamps 1, 1' are connected mechanically in series but electrically in parallel one to the other.

A variant in which the power supplies of the sequence of lamps connected one to the other are connected electrically in series with the poser feeding line is also possible.

1 LED lamp
2 Lamp body
3 Lamp end
4 Hanging system for hanging the lamp to ceiling
5 Connector
6 Supply cable
7 Hole
8 LED
9 Sunlight coming from outside
10 Shadow projected by lamp
11 Power supply
12 Metal frame
13 gaskets 14 PCB
15 Transparent cover
16 Wing
17 Wing
18 Connector
19 Connector longitudinal axis
20 Lamp longitudinal axis
102 upper shell
202 lateral wall
302 hook-like rim
402 lower shell
502 lateral wall
602 grooves
702 inclined surface
802 first part of the inclined surface
812 second part of the inclined surface
902 longitudinal wing
1002 terminal wing
1012 rib
1020 groove

The invention claimed is:

1. A lamp adapted to grow plants in a greenhouse, said lamp having an elongated shape with a longitudinal axis, an upper wall and a lower wall, the lower wall being configured to be positioned parallel to a ground in horizontal position, said lamp further comprising;
   at least one light emitting source; and
   at least one connector adapted to connect in series two adjacent lamps,
   wherein the at least one connector is placed at the lower wall and a longitudinal axis of the connector, or a direction for plugging or unplugging the connector so as to connect the two adjacent lamps, is oriented orthogonally with respect to the longitudinal axis of the lamp and to the lower wall, and
   wherein the lamp is formed by two channel-shaped shells, one of the two channel-shaped shells being an upper shell having an open side facing a lower shell, and the other one of the channel-shaped shaped shells being the lower shell having an open side facing the upper shell, the upper shell having divergent lateral walls, a distance of the lateral walls at an open side being larger than a distance of the lateral walls of the lower shell, the upper shell overlapping the lower shell for a length of the lateral walls of the lower shell in a direction transverse to a longitudinal axis of the said upper and lower shells.

2. The lamp according to claim 1, wherein a transversal section of said lamp has an elliptical or polygonal shape which is inscribable in an ellipsoid, the elliptical or the polygonal shape being oriented with a major axis thereof perpendicular to the ground.

3. The lamp according to claim 2, wherein at least one of the upper wall of the lamp or of a minor axis of the elliptical or polygonal shapes has a dimension, in a direction transversal to the longitudinal axis of the lamp, which is greater than a corresponding dimension of the lower wall and/or of the at least one connector.

4. The lamp according to claim 1, wherein said at least one light emitting source emits a light cone oriented with an angle between 30° to 45° towards the ground.

5. The lamp according to claim 1, wherein said at least one light emitting source emits a light cone oriented with an angle between 0° to 60° towards the ground.

6. The lamp according to claim 1, wherein the upper and lower shells are provided respectively with an inner hook-shaped rim and with a groove open towards an outside for engaging the hook-shaped rim, the hook-shaped rim and the groove having downward inclined surfaces oriented from an inside to the outside of the lamp and forming water discharging surfaces projecting outwards from the lateral walls of the lower shell.

7. The lamp according to claim 1, further comprising:
   a metal frame;
   a couple of gaskets; and
   a couple of printed circuit boards (PCB),
   wherein the at least one light emitting source comprises a plurality of LEDs mounted at a regular distance.

8. The lamp according to claim 7, wherein said metal frame comprises a couple of wings, which keep said PCB, on which said plurality of the LEDs are mounted, at a desired inclination.

9. The lamp according to claim 7, wherein inside said metal frame there is provided a power supply, and wherein heat emitted by said power supply and said lamp is used to heat said greenhouse.

10. The lamp according to claim 7, further comprising providing each of the at least two lamps with a transparent cover protecting the light emitting source of each lamp.

11. The lamp according to claim 1, wherein electrical supply is performed via a feed-through wiring, so that a first lamp of a series of lamps is connectable only to mains.

12. The lamp according to claim 1, wherein said at least one light emitting source emits light having a wavelength in a range of 630-670 nm.

13. A method of lighting plants grown in a greenhouse, comprising the following steps:
   providing at least two lamps according to claim 1;
   hanging said at least two lamps; and
   connecting said at least two lamps in series; and
   placing ends of said at least two lamps in contact with each other.

14. The method according to claim 13, wherein connecting said at least two lamps comprises connecting with a feed-through wiring.

15. The method according to claim 13, further comprising generating heat with the at least two lamps that does not exceed 55° C.

16. The lamp according to claim 1, wherein said at least one light emitting source emits light having a wavelength is in a range of 400-500 nm.

17. The lamp according to claim 1, wherein said at least one light emitting source emits a light cone oriented with a 30° angle towards the ground.

* * * * *